(12) United States Patent
Peltola

(10) Patent No.: US 11,932,349 B2
(45) Date of Patent: Mar. 19, 2024

(54) POWER UNIT AND METHOD

(71) Applicant: Gates Corporation, Denver, CO (US)

(72) Inventor: Iiro Peltola, Tampere (FI)

(73) Assignee: GATES CORPORATION, Denver, CO (US)

( * ) Notice: Subject to any disclaimer, the term of this patent is extended or adjusted under 35 U.S.C. 154(b) by 0 days.

(21) Appl. No.: 17/622,296

(22) PCT Filed: Jun. 26, 2020

(86) PCT No.: PCT/FI2020/050468
§ 371 (c)(1),
(2) Date: Dec. 23, 2021

(87) PCT Pub. No.: WO2020/260772
PCT Pub. Date: Dec. 30, 2020

(65) Prior Publication Data
US 2022/0258832 A1    Aug. 18, 2022

(30) Foreign Application Priority Data

Jun. 28, 2019 (FI) ...................................... 20195587

(51) Int. Cl.
*B62M 6/45* (2010.01)
*B62M 6/55* (2010.01)
(Continued)

(52) U.S. Cl.
CPC ................ *B62M 6/45* (2013.01); *B62M 6/55* (2013.01); *B62M 11/145* (2013.01);
(Continued)

(58) Field of Classification Search
CPC . B62M 6/45; B62M 6/55; F16D 28/00; F16D 41/24; F16H 3/72; F16H 1/28
See application file for complete search history.

(56) References Cited

U.S. PATENT DOCUMENTS 10,266,229 B2 * 4/2019 Yamamoto ............... B62M 9/10
2011/0303474 A1   12/2011 Kimmich et al.
(Continued)

FOREIGN PATENT DOCUMENTS

EP        3188957 A1    7/2017
WO    2016034574 A1    3/2016

OTHER PUBLICATIONS

International Search Report issued by the Finnish Patent and Registration Office acting as the International Searching Authority in relation to International Application No. PCT/FI2020/050468 dated Oct. 2, 2020 (4 pages).
(Continued)

*Primary Examiner* — Huan Le
(74) *Attorney, Agent, or Firm* — Robert P. Michal, Esq.; Carter, DeLuca & Farrell LLP

(57) ABSTRACT

A power unit for a pedal vehicle includes a pedal shaft, an output shaft arranged to transfer torque to a vehicle wheel, a main epicyclic gear set arranged to control transmission ratio between the pedal shaft and the output shaft, an assist motor connected to an assist gear of the main epicyclic gear set, and a control motor connected to a control gear of the main epicyclic gear set. The control motor and the control gear form a control assembly of the power unit. The power unit includes a one-way clutch provided to the control assembly of the power unit and arranged to transmit rotation in only a first rotation direction.

11 Claims, 4 Drawing Sheets

(51) Int. Cl.
  *B62M 11/14* (2006.01)
  *F16D 28/00* (2006.01)
  *F16D 41/24* (2006.01)
  *F16H 1/28* (2006.01)
  *F16H 3/72* (2006.01)
(52) U.S. Cl.
  CPC ............. *F16D 28/00* (2013.01); *F16D 41/24* (2013.01); *F16H 3/72* (2013.01); *F16H 1/28* (2013.01)

(56) References Cited

U.S. PATENT DOCUMENTS

| | | |
|---|---|---|
| 2017/0137086 A1 | 5/2017 | Yamamoto |
| 2017/0183056 A1 | 6/2017 | Yamamoto |
| 2017/0217537 A1 | 8/2017 | Yamamoto |
| 2017/0219066 A1 | 8/2017 | Yamamoto |

OTHER PUBLICATIONS

Written Opinion of the International Searching Authority issued by the Finnish Patent and Registration Office acting as the International Searching Authority in relation to International Application No. PCT/FI2020/050468 dated Oct. 2, 2020 (8 pages).

Finnish Search Report issued by the Finnish Patent and Registration Office in relation to Finnish Application No. 20195587 dated Jan. 24, 2020 (1 page).

* cited by examiner

POWER UNIT AND METHOD

CROSS-REFERENCE TO RELATED APPLICATIONS

This application is a national phase entry under 35 U.S.C. 371 of PCT International Application No. PCT/FI2020/050468 filed Jun. 26, 2020, which claims priority to Finnish Patent Application No. 20195587, filed Jun. 28 2019, the disclosure of each of these applications is expressly incorporated herein by reference in their entirety.

FIELD OF THE INVENTION

The present invention relates to a power unit for a pedal vehicle. The present invention further relates to a method for operating a power unit.

BACKGROUND OF THE INVENTION

In the prior art, it is known that utilize two separate motors in an electrical pedal vehicle. The motor unit of a pedal vehicle comprises a pedal shaft, chainwheel arranged to transfer torque to a vehicle wheel and a main epicyclic gear set arranged to control transmission ratio between the pedal shaft and the chainwheel. The power unit comprises an assist motor connected to an assist gear of the main epicyclic gear set and arranged to transmit torque to the assist gear. The power unit further comprises a control motor connected to a control gear of the main epicyclic gear set and arranged to transfer torque to the control gear. Accordingly, the assist motor is arranged to provide assist power to the pedal shaft via the epicyclic gear set for the user for assisting the user during pedalling. On the other hand, the control is arranged to change the transmission ratio of the motor unit and between the pedal shaft and the chainwheel.

The control motor comprises a rotor connected to the control gear of the epicyclic gear set. The rotation of the rotor is transmitted to the control gear. Therefore, rotation speed of the rotor of the motor is arranged to control the rotation speed of the control gear of the epicyclic gear set in a first rotation direction and thus the transmission ratio between the pedal shaft and the chainwheel.

One of the problems associated with the prior art is that is that at lower transmission ratios the rotation direction of the control gear may change to opposite to the first rotation direction, meaning to a second rotation direction. However, the problem with changed rotation direction of the control gear is that the opposite, or second, rotation direction is transmitted also to the rotor of the control motor. This further causes that the torque is not transmitted from the control motor to the control gear, but from the control gear to the control motor. Thus, the control motor may heat up decreasing the life time of the control motor and also the overall efficiency of the power unit.

BRIEF DESCRIPTION OF THE INVENTION

An object of the present invention is to provide a power unit and method so as to overcome or at least alleviate the prior art disadvantages.

The preferred embodiments of the invention are disclosed in the dependent claims.

The invention is based on the idea of providing a power unit for pedal vehicle. The power unit comprises a pedal shaft, an output shaft arranged to transfer torque to a vehicle wheel and a main epicyclic gear set arranged to control transmission ratio between the pedal shaft and the output shaft. The main epicyclic gear set comprises a sun gear, a ring gear, plurality of planet gears between the sun gear and the ring gear and a planet carrier connected to the planet gears. The power unit further comprises an assist motor connected to an assist gear of the main epicyclic gear set and arranged to transmit torque to the output shaft, and a control motor connected to a control gear of the main epicyclic gear set and arranged to adjust the transmission ratio of the main epicyclic gear set. The control motor and the control gear forming a control assembly of the power unit. According to the present invention the power unit further comprises a one-way clutch provided to the control assembly of the power unit and arranged to transmit rotation in only a first rotation direction. Further according to the present invention, the pedal shaft is connected to the planet carrier, the ring gear is connected to the output shaft, the control motor is connected to the sun gear and the assist motor is connected to the ring gear. Therefore, the ring gear forms the assist gear and the sun gear forms the control gear. Accordingly, the control motor and the sun gear form the control assembly and the one-way clutch is provided to the control assembly.

The output shaft may be a chainwheel, pulley for belt drive or cardan shaft. The output shaft is arranged to transmit the torque to the wheel of the pedal vehicle.

According to the present invention, the one-way clutch is provided to the control assembly such that the rotation of the rotor of the control motor in a second direction is prevented. Therefore, the torque is not transmitted from the control gear of the main epicyclic gear to the rotor of the control in the second rotation direction and the rotor of the motor is enabled to rotate only in the first rotation direction. Further, in this configuration the torque provided by the assist motor is not transmitted or passed to the control motor. This configuration further provides high power unit efficiency and enables utilizing smaller control motor. Smaller control motor further enables compact power unit.

In one embodiment, the control motor comprises a rotor, and the one-way clutch is provided in connection with the rotor of the control motor and arranged to transmit rotation in the rotor in only the first rotation direction.

In this embodiment, the one-way clutch is arranged in connection with the control motor and connected to operatively connected to the rotor of the control motor. Therefore, control gear of the main epicyclic gear set may rotate in the first and second rotation directions, but the rotor of the control motor is prevented from rotating in the second rotation direction.

In another embodiment, the one-way clutch is provided between the control motor and the control gear and arranged to transmit rotation between the control motor and the control gear in only the first rotation direction.

In a further embodiment, the one-way clutch is provided in connection with the control gear and arranged to transmit rotation in the control gear in only the first rotation direction.

In this embodiment, the rotation of the control gear is the prevented in the second rotation direction. When the rotation of the control gear is prevented in the second rotation direction, the torque is not transmitted to the control motor and the rotor of the control gear in the second operating direction.

In one embodiment, the one-way clutch comprises a first operating state in which the one-way clutch is arranged to transmit rotation in the first rotation direction of the control gear, and a second operating state in which the one-way clutch is prevented from transmitting rotation in a second rotation direction of the control gear.

The first and second operating state may be provided with any of the above configurations. Further, the first and second operating state may be provided with the one-way clutch in the control motor, in the control gear or between the control motor and the control gear.

In one embodiment, the one-way clutch is provided in connection with the rotor of the control motor. In the first operating state of the one-way clutch, the rotor of the control motor is arranged to rotate in the first rotating direction and in the second operating state of the one-way clutch rotation of the rotor of the control motor in the second rotation direction is prevented. Accordingly, no modifications need to be made to the main epicyclic gear set or to the connection between the control gear and the control motor.

In another embodiment, the one-way clutch is provided between the control motor and the control gear. In the first operating state of the one-way clutch the one-way clutch is arranged to transmit rotation in the first rotation direction between the control motor and the control gear, and in the second operating state of the one-way clutch the one-way clutch is arranged to prevent transmission of rotation in the second rotation direction between the control motor and the control gear. Accordingly, no modifications need to be made to the main epicyclic gear set or to the control gear.

In a further embodiment, the one-way clutch is provided in connection with the control gear. In the first operating state of the one-way clutch the control gear is arranged to rotate in the first rotating direction and in the second operating state of the one-way clutch rotation of the control gear in the second rotation direction is prevented. Accordingly, no modifications need to be made to the control motor or to the connection between the control gear and the control motor.

The one-way clutch may be provided in several different manners. In some embodiment, the one-way clutch is arranged to prevent transmitting rotation in the second operating state.

In one embodiment, the one-way clutch comprises a freewheel arranged to transmit rotation in the first rotation direction and prevent transmitting rotation in the second rotation direction. Freewheel provides a simple and efficient mechanical structure which enables rotation in the first rotation direction such that torque is transmitted and rotation also in the second direction such that torque is not transmitted. Thus, freewheel is arranged or enabled to transmit torque in the first rotation direction and prevented from or disabled to transmitting torque in the second rotation direction.

In one embodiment, the one-way clutch comprises a wedge lock mechanism having the first operating state in which the wedge lock mechanism is in disengaged position and arranged to transmit rotation in the first rotation direction, and the second operating state in which the wedge lock mechanism is in engaged position and arranged to prevent rotation in the second rotation direction.

In a yet further embodiment, the one-way clutch comprises a synchro mechanism arranged to enable transmitting torque in the first rotation direction and prevent rotation in the second rotation direction. The synchro mechanism comprises first operating state in which the synchro mechanism is in disengaged position and arranged to transmit rotation in the first rotation direction, and the second operating state in which the synchro mechanism is in engaged position and arranged to prevent rotation in the second rotation direction.

In a further embodiment, the one-way clutch comprises a friction lock mechanism having the first operating state in which the friction lock mechanism is in disengaged position and arranged to transmit rotation in the first rotation direction, and the second operating state in which the friction lock mechanism is in engaged position and arranged to prevent rotation in the second rotation direction.

In a yet further embodiment, the one-way clutch comprises a band lock mechanism having the first operating state in which the band lock mechanism is in disengaged position and arranged to transmit rotation in the first rotation direction, and the second operating state in which the band lock mechanism is in engaged position and arranged to prevent rotation in the second rotation direction.

In further alternative embodiments the one-way clutch may be provided such that rotation in the second rotation direction or transmitting rotation torque in the second rotation direction is actively controlled or prevented.

In another embodiment, the one-way clutch comprises an electronic clutch motor arranged in connection with the control assembly, the electronic clutch motor arranged to operate the one-way clutch and set the one-way clutch to the first and second operating state, respectively.

In a further embodiment, the power unit comprises a hydraulic motor as the control motor and arranged in connection with the control assembly, the hydraulic motor having the first operating state in which the hydraulic motor is configured to enable rotation in the first rotation direction, and the second operating state in which the rotation in the second rotation direction is prevented, the hydraulic motor. The hydraulic motor comprising a control valve controlling the operation of the hydraulic motor. The control is arranged to form the one-way-clutch. The control valve comprises the first operating state in which the control valve is in open position and arranged to transmit torque in the first rotation direction, and the second operating state in which the control valve is in closed position and arranged to prevent transmission of torque in the second rotation direction.

The power unit is arranged in connection with the pedal shaft of the pedal vehicle. The power unit comprises a housing accommodating the main epicyclic gear set, the assist motor and the control motor. The housing comprises a hub arranged around the pedal shaft and an arm extending from the hub.

In further embodiment of the present invention, the pedal shaft is connected to the planet carrier, the output shaft is to the ring gear, the control motor is connected to the sun gear and the assist motor is connected to the ring gear. The control motor and the sun gear form the control assembly and the one-way clutch is provided to the control assembly.

The power unit is arranged in connection with the pedal shaft. The power unit comprises the housing accommodating the main epicyclic gear set, the control motor and the assist motor. The housing comprises a hub arranged around the pedal shaft and an arm extending from the hub. The control motor is arranged in the hub and the assist motor is arranged in the arm. As mentioned above, in this configuration the control motor may be smaller and thus hub of the power unit may be provided compact.

In one embodiment, the power unit also comprises at least one reduction gear set between control motor and the main epicyclic gear set.

Alternatively, in one embodiment the power unit comprises at least one reduction gear set between assist motor and the main epicyclic gear set.

In one embodiment, the power unit comprises at least one reduction gear set between control motor and the main epicyclic gear set, and at least one reduction gear set between assist motor and the main epicyclic gear set.

The reduction gear or reduction gear set is a commonly known arrangement by which an input rotation speed can be lowered for a requirement of slower output rotation speed, with same or more output torque. In other words, the reduction gear set enables lower torque generation with higher input rotation speed, or lower output rotation speed with higher torque.

The present invention further relates to a method for operating a power unit of pedal vehicle having a pedal shaft and an output shaft for transferring torque to a vehicle wheel. The method comprises controlling transmission ratio between the pedal shaft and the output shaft with a main epicyclic gear set, transmitting torque to an assist gear of the main epicyclic gear set with an assist motor for transmitting torque to an output shaft of the pedal vehicle, and adjusting the transmission ratio of the main epicyclic gear set with a control motor by transmitting torque to a control gear of the epicyclic gear set. The control motor and the control gear forming a control assembly of the power unit. The main epicyclic gear set comprises a sun gear, a ring gear, plurality of planet gears between the sun gear and the ring gear and a planet carrier connected to the planet gears.

The method of the present invention further comprises operating the power unit in a first operating mode in which the control gear rotates in a first rotation direction, in which first operating mode the control motor is operable adjusting the transmission ratio of the main epicyclic gear set by transmitting torque to the control gear, and operating the power unit in a second operating mode in which torque transmission between the control gear and the control motor is disabled.

According to the present invention the method further comprises transmitting power to the ring gear of the main epicyclic gear set with the assist motor for transmitting power to the output shaft of the pedal vehicle and adjusting the transmission ratio of the main epicyclic gear set with the control motor by transmitting power to sun gear of the epicyclic gear set, the control motor and the sun gear forming the control assembly of the power unit. The method further comprises operating the power unit in the first operating mode in which the sun gear rotates in the first rotation direction, in which first operating mode the control motor is operable adjusting the transmission ratio of the main epicyclic gear set by transmitting power to the sun gear, and operating the power unit in the second operating mode in which torque transmission between the of the sun gear and the control motor is disabled.

In one embodiment, the second operating mode is activated at lowest transmission ratio or at the predetermined transmission ratio of the main epicyclic gear set. Accordingly, the second operating mode actually determines the lowest transmission ratio of the epicyclic gear set as it prevents torque transmission between the control motor and the control gear at the lowest transmission ration.

According to one embodiment, in the second operating mode rotation of a rotor of the control motor is prevented.

In another embodiment, in the second operating mode torque transmission between the control motor and the sun gear of the main epicyclic gear set is disabled.

In further embodiment, in the second operating mode rotation of the sun gear of the main epicyclic gear set is prevented.

In one embodiment of the present invention, adjusting the transmission ratio of the main epicyclic gear set in the second operating mode is disabled with a one-way clutch provided in connection with the control assembly.

In another embodiment of the present invention, adjusting the transmission ratio of the main epicyclic gear set in the second operating mode is disabled with a freewheel provided in connection with the control assembly.

In yet another embodiment, adjusting the transmission ratio of the main epicyclic gear set in the second operating mode is disabled with a one-way clutch as disclosed above.

An advantage of the invention is that that transmission of torque from the control gear to the rotor of the control is prevented at the low transmission ratio of the main epicyclic gear set when the control gear would otherwise rotate in the second rotation direction opposite the first rotation direction. Further, the rotation of the control gear is not transmitted to the rotor of the control motor when the rotation speed of the control is zero or negative in relation to the first rotation direction. Therefore, rotation of the rotor of the control motor in the second rotation direction is prevented. This, prevents the control motor from hating excessively and further the efficiency of the power unit is increased.

BRIEF DESCRIPTION OF THE DRAWINGS

The invention is described in detail by means of specific embodiments with reference to the enclosed drawings, in which.

DETAILED DESCRIPTION OF THE INVENTION

Figure 1A:
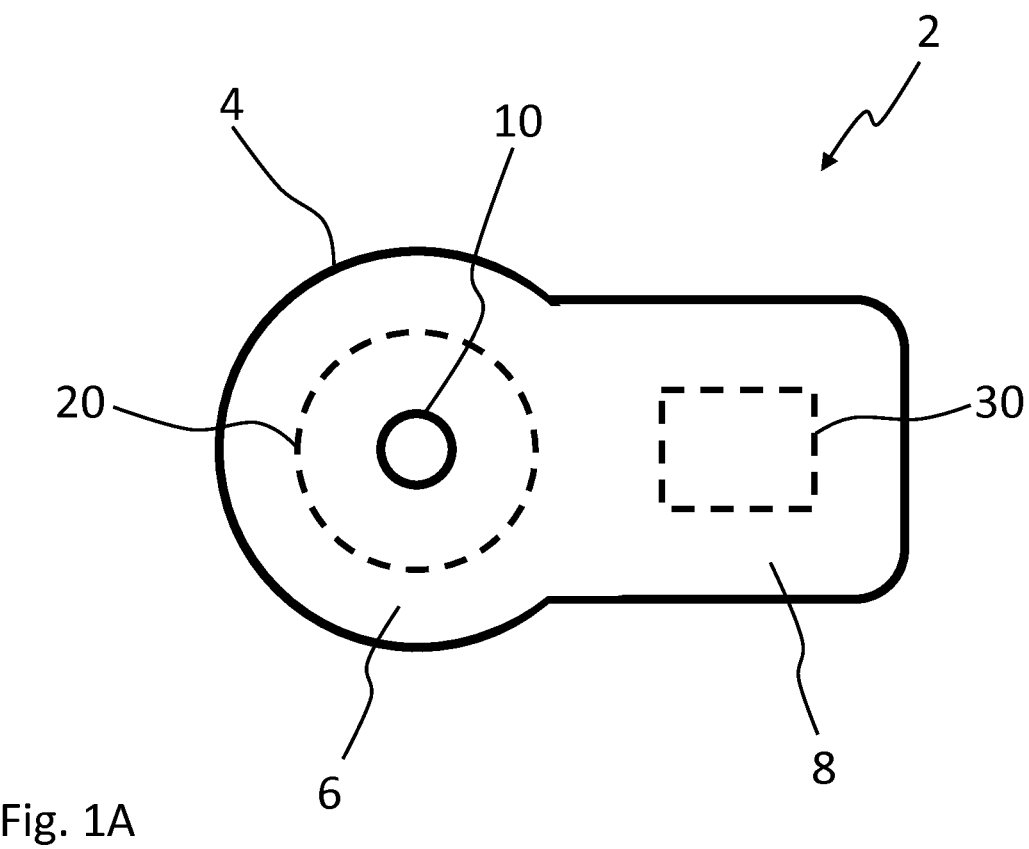
FIG. 1A shows schematically one embodiment of power unit of the pedal vehicle.

FIG. 1A shows schematically a power unit 2 for a pedal vehicle. The power unit 2 comprises a housing 4. The power unit 2 further comprises hub 6 or hub part to be arranged around a pedal shaft 10 of the pedal vehicle. The power unit 2 also comprises an arm 8 or arm part extending from the hub 6. The housing 4 forms both the hub 6 and the arm 8, and encloses the components of the power unit 2. The power unit 2 comprises a hub motor 20 arranged to the hub 6 and in connection with the pedal shaft 10 inside the housing 4. The power unit also comprises an arm motor 30 arranged to the arm 8 and inside the housing 4.

The housing 4 represents also body of the power unit 2.

The power unit 2 comprises two motors, a control motor arranged to adjust transmission ratio of the power unit 2 and an assist motor arranged to assist pedalling of the pedal vehicle. The control motor may be a hub motor or an arm motor, and the assist motor may be an arm motor or a hub motor, respectively, depending on the embodiment.

Figure 1B:
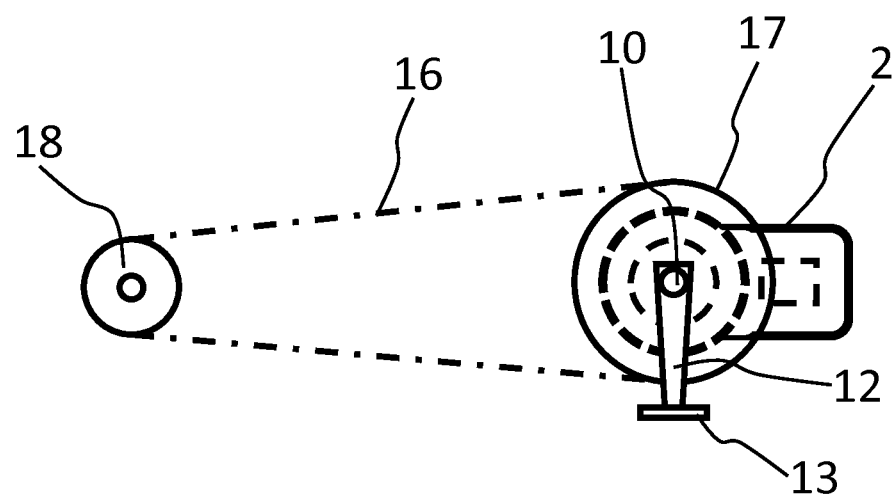
FIG. 1B shows schematically one embodiment of power unit of the pedal vehicle in connection with a transmission system of a pedal vehicle.

FIG. 1B shows schematically transmission system of a pedal vehicle. The transmission system comprises the pedal shaft 10 to which pedal cranks 12 are connected. At the distal end of the pedal crank 12 there is a pedal 13 for pedalling the pedal vehicle. There is further a chainwheel 17 operatively connected pedal shaft 10 for transmitting torque from the pedal shaft 10 via the chainwheel 17 with a chain 16 to a rear wheel sprocket 18 arranged to the rear wheel of the pedal vehicle. The power unit 2 is arranged to or in connection with the pedal shaft 10.

The chainwheel 17 forms an output shaft of the transmission system.

Figure 2:
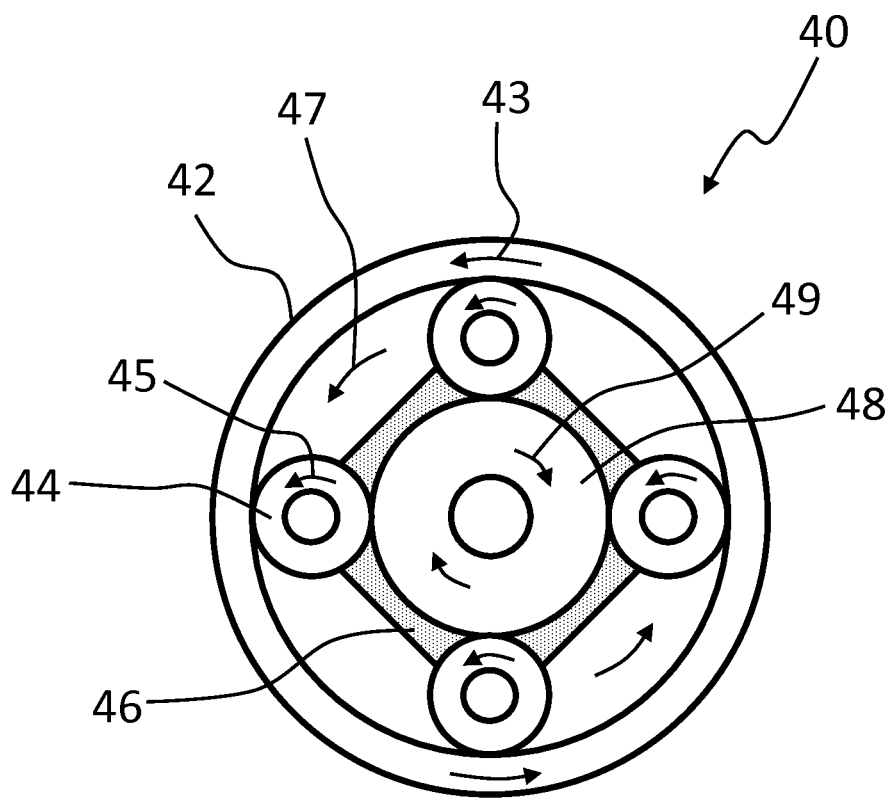
FIG. 2 shows schematically one embodiment of an epicyclic gear set.

FIG. 2 shows schematically an epicyclic gear set 40. The main epicyclic gear set comprises a sun gear 48, a ring gear 42, plurality of planet gears 44 between the sun gear 48 and the ring gear 42 and a planet carrier 46 connected to the planet gears 44. The basic operating principle of the epicyclic gear set or planetary gear set is commonly known and it is not described in detail in this application.

Figure 3:
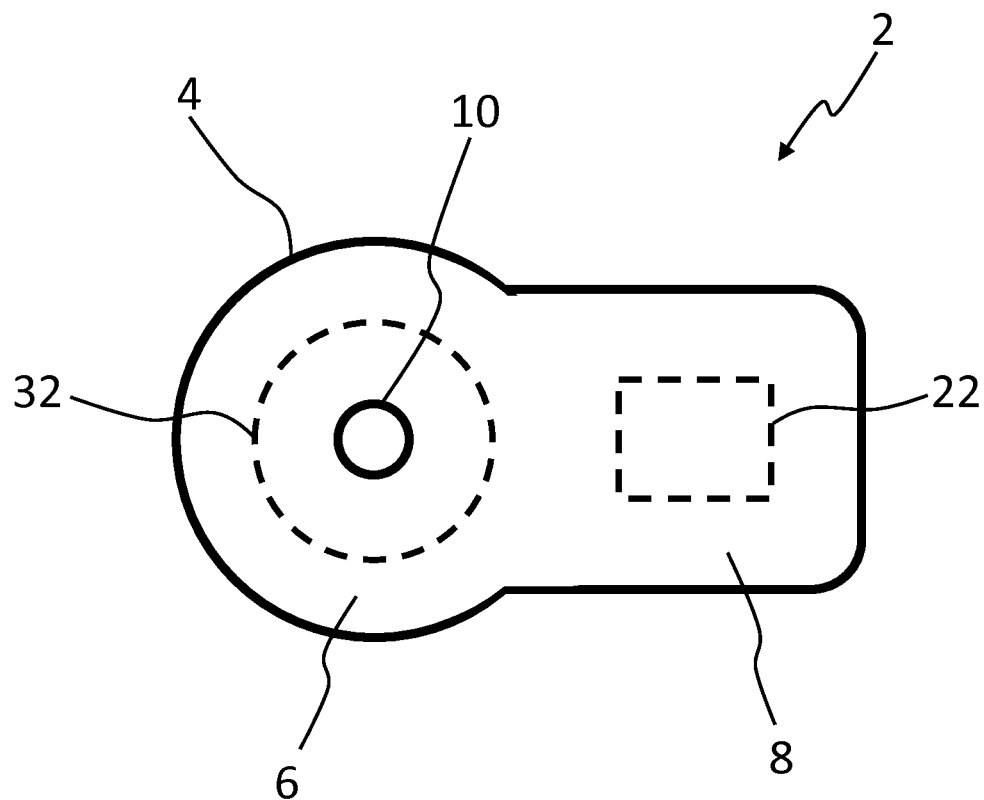
FIG. 3 shows schematically one embodiment of power unit of the pedal vehicle.

FIG. 3 shows one embodiment of the power unit 2 according to the present invention. In this embodiment, the control motor 32 is provided as a hub motor and arranged in connection with the pedal shaft 10 or around the pedal shaft 10. The control motor 32 is arranged inside the housing 4 and to the hub 6 of the housing 4. The assist motor 22 is provided as an arm motor. The assist motor 22 is arranged inside the housing 4 and to the arm 8 of the housing 4.

Figure 4:
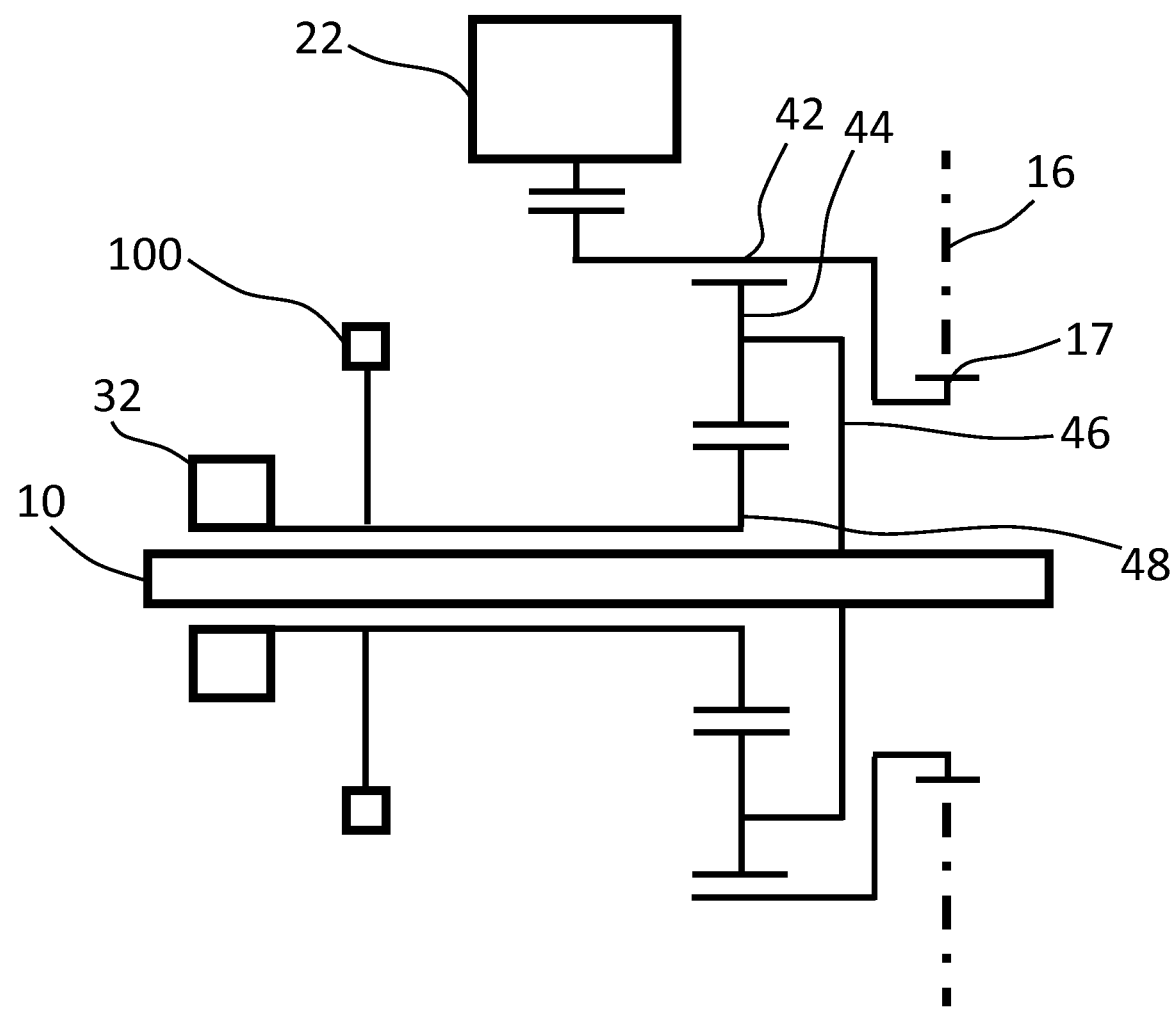
FIG. 4 shows one schematic diagram of the power unit of FIG. 3.

FIG. 4 shows schematically a diagram of one power unit 2 according to the FIG. 3. The power unit 2 comprises the main epicyclic gear set 40 arranged to control transmission ratio between the pedal shaft 10 and the chainwheel 17. The power unit 2 further comprises the assist motor 22 connected to an assist gear of the main epicyclic gear set 40 and arranged to transmit torque to the chainwheel 17. The assist motor 22 is provided as the arm motor.

The power 2 unit also comprises the control motor 32 connected to a control gear of the main epicyclic gear set 40 and arranged to adjust the transmission ratio of the main epicyclic gear set 40. The transmission ratio is adjusted between the pedal shaft 10 and the chainwheel 17 with the epicyclic gear set 40. The control motor 32 and the control gear form a control assembly of the power unit 2.

The epicyclic gear set 40 is provided between the pedal shaft 10 and the chainwheel 17 for adjusting the transmission ratio.

As shown in FIG. 6, the planet carrier 46 of the epicyclic gear set 40 is connected to the pedal shaft 10. The assist motor 22 is also connected to the ring gear 42. Further, the control motor 32 is connected to the sun gear 48 of the epicyclic gear set 40. Thus, the sun gear 48 is the control gear in this embodiment. The ring gear 42 is connected to the chainwheel 17. Thus, the assist motor 22 is connected to the chainwheel 17.

This configuration is preferable, as the torque provided by the assist motor 22 is not transmitted to or has no effect on the control motor 32.

As shown in FIG. 6, a one-way clutch 100 is provided to the sun gear 48. The one-way clutch 100 is arranged to prevent the sun gear 48 from rotating in a second rotation direction. Accordingly, the one-way clutch 100 is arranged to enable the sun gear 48, or the control gear, to rotate only in one rotation direction, meaning the first rotation direction.

As the one-way clutch 100 is provided to the sun gear 48 and the sun gear 48 is prevented from rotating in the second rotation direction, torque from the sun gear 48 is not transmitted to the control motor 32, or the rotor of the control motor 32 in the second rotation direction of the sun gear 48.

Accordingly, in a first operating mode of the power unit 2 and in a first operating state of the one-way clutch 100, the one-way clutch 100 is arranged to transmit rotation in the first rotation direction of the sun gear 48 from the control motor 32. Similarly, in a second operating mode of the power unit 2 and in a second operating state of the one-way clutch 100, the one-way clutch 100 prevents the sun gear 48 from rotating in the second rotation direction opposite to the first rotation direction.

In the embodiment of FIG. 6, the one-way clutch 100 is a freewheel provided to the sun gear 48 or in connection with the sun gear 48.

The one-way clutch or the freewheel 100 is provided between the housing 4 and the sun gear 48. Thus, the freewheel 100 or the one-way clutch is supported to the housing 4. Thus, the one-way clutch or the freewheel 100 is arranged to enable rotation of the sun gear 48, or the control gear, in the first rotation direction in relation to the housing 4 and disable or prevent rotation of the sun gear 48, or the control gear, in the second rotation direction in relation to the housing 4 of the power unit 2.

It should be noted, that the freewheel 100 or the one-way clutch may be supported to the housing 4 or the body of the power unit directly or indirectly via other parts of the power unit 2. Therefore, in the present application the free-wheel 100 is supported in relation to the housing 4 or the body of the power unit 2, directly or indirectly. This, may apply to embodiments of the invention and this definition is repeated with every embodiment.

In the embodiment of FIG. 6, the control motor 32 provides torque to the sun gear 48 in the first rotation direction of the sun gear 48 for adjusting the transmission ratio of the epicyclic gear set 40. The assist motor 22 provides torque to the ring gear 42 which is connected to the chain wheel 17. Thus, the assist motor 22 provides assist power or torque to the chainwheel 17 via the ring gear 42. This is preferable configuration as the ring gear has the largest diameter in the epicyclic gear set 40 and thus the assist torque of the assist motor 22 is high.

The freewheel 10 is arranged to transmit torque or enable the sun gear 48 to rotate in the first rotation direction.

In an alternative embodiment, the one-way clutch 100 may be provided between the control motor 32 and the sun gear 48. In this embodiment, the one-way clutch 100 arranged to transmit torque or rotation between the control motor 32 and the sun gear 48 in the first rotation direction of the rotor of the control motor 32 and/or the sun gear 48 and disabled to transmit torque in the second rotation direction of the rotor of the control motor 32 and/or the sun gear 48.

Also in this embodiment, the one-way clutch 100 may be a freewheel 100 arranged transmit torque in the first or rotation between the control motor 32 and the sun gear 48 in the first rotation direction of the rotor of the control motor 32 and/or the sun gear 48 and disabled to transmit torque in the second rotation direction of the of the rotor of the control motor 32 and/or the sun gear 48. The freewheel 10 is supported to the housing 4 of the power unit 2 or in relation to the housing 4. Therefore, the freewheel 100 is arranged transmit torque in the first or rotation between the control motor 32 and the sun gear 48 in the first rotation direction of the rotor of the control motor 32 and/or the sun gear 48 in relation to the housing 4 and disabled to transmit torque in the second rotation direction of the of the rotor of the control motor 32 and/or the sun gear 48 in relation to the housing 4.

Accordingly, in the first operating mode of the power unit 2 and in the first operating state of the one-way clutch 100, the one-way clutch 100 is arranged to transmit rotation in the first rotation direction between the sun gear 48 and the control motor 32. Similarly, in the second operating mode of the power unit 2 and in the second operating state of the one-way clutch 100, the one-way clutch 100 prevents transmission or disables transmission of torque between the sun gear 48 and the control motor 32 in the second rotation direction opposite to the first rotation direction.

In a further alternative embodiment of FIG. 4, the one-way clutch 100 is provided to the control motor 32 or to the rotor of the control motor 32. The one-way clutch 100 is arranged to prevent the rotor of the control motor 32 from rotating in the second rotation direction. Accordingly, the one-way clutch 100 is arranged to enable the rotor of the control motor 32 to rotate only in one rotation direction, meaning the first rotation direction. The freewheel or the one-way clutch 100 is supported to the control motor 32 or the body of the control motor 32, directly or indirectly. Thus, the free-wheel or the one-way clutch is supported in relation to the control motor 32 or the body of the control motor 32.

As the one-way clutch 100 is provided to the rotor of the control motor 32 or in connection with the rotor, the rotor is prevented from rotating in the second rotation direction.

Accordingly, in the first operating mode of the power unit 2 and in the first operating state of the one-way clutch 100, the one-way clutch 100 is arranged to transmit rotation in the first rotation direction from the control motor 32 to the sun gear 48. Similarly, in the second operating mode of the power unit 2 and in the second operating state of the one-way clutch 100, the one-way clutch 100 prevents the rotor of the control motor 32 from rotating in the second rotation direction opposite to the first rotation direction.

The one-way clutch 100 is preferably a freewheel provided to the control motor 32 the rotor thereof, or in connection with rotor.

The one-way clutch or the freewheel 100 is provided between control motor body and the rotor or between the rotor of the control motor 32 and the housing 4. Thus, the freewheel 100 or the one-way clutch is supported to the control motor body or to the housing 4. Thus, the one-way clutch or the freewheel 100 is arranged to enable rotation of the rotor in the first rotation direction in relation to the control motor body, or the housing 4, and disable or prevent rotation of the rotor in the second rotation direction in relation to the control motor body or the housing 4 of the power unit 2.

According to the present invention, the one-way clutch 100 comprises the first operating state in which the one-way clutch 100 is arranged to transmit rotation in the first rotation direction of the control gear 42, 48 between the control motor 31, 32 and the control gear 42, 48, and the second operating state in which the one-way clutch 100 is prevented from transmitting rotation in a second rotation direction of the control gear 31, 32 between the control gear 42, 48 and the control motor 31, 32.

As disclosed in the above embodiments, the one-way clutch 100 may be a freewheel. The freewheel may also be replaced with a one-way gear mechanism arranged to transmit rotation in the first rotation direction and prevent transmitting rotation in the second rotation direction, or with a worm gear mechanism arranged to transmit rotation in the first rotation direction and prevent transmitting rotation in the second rotation direction. Further alternatively, one-way clutch 100 may be provided as a synchro mechanism arranged to transmit rotation in the first rotation direction and prevent transmitting rotation in the second rotation direction. These embodiments of the one-way clutch 100 disable transmission of the rotation in the second rotation direction, but do not lock the control gear 42, 48 or the rotor of the control motor 31, 32. This embodiment also provides mechanical structure preventing transmission of the rotation in the second rotation direction.

Alternatively, the one-way clutch 100 may be a wedge lock mechanism, one-way gear mechanism, a friction lock mechanism, a band lock mechanism or the like lock mechanism. In these embodiments, the lock mechanism comprises the first operating state in which the lock mechanism is in disengaged position and arranged to transmit rotation in the first rotation direction, and the second operating state in which the lock mechanism is in engaged position and arranged to prevent transmitting rotation in the second rotation direction. In these embodiments, the power unit 2 comprises a control unit (not shown) for controlling and operating the lock mechanism for setting the lock mechanism to the first and second operating states, and the disengaged and engaged positions, respectively.

In the above embodiments, the control assembly may comprise an electronic clutch motor (not shown) arranged in connection with the control assembly. The electronic clutch motor is arranged to operate the one-way clutch 100 or the lock mechanism and set the one-way clutch 100 or the lock mechanism to the first and second operating states, respectively. The operation of the electronic clutch motor is controlled with the control unit.

The operation of the electronic clutch motor is controlled with the control unit.

In a further embodiment, the control motor is a hydraulic motor arranged in connection with the control assembly. The hydraulic motor comprises a control valve having the first operating state in which the hydraulic motor is configured to enable rotation in the first rotation direction, and the second operating state in which the rotation in the second rotation direction is prevented. The control valve of the hydraulic motor forms the one-way-clutch. Thus, in the first operating state the control valve is in open position and the hydraulic motor is arranged to rotate the control gear in the first rotation direction. In the second operating state the control valve is in closed position and the hydraulic motor does not transmit torque to the control gear. Thus, in the second operating state the hydraulic motor may be operable to keep the control gear 42, 48 still. The operation of the hydraulic motor or the control valve is controlled with the control unit.

The present invention further provides a method for operating a power unit 2 of the pedal vehicle. The method is utilized by the power unit as disclosed above.

It should be noted that the power unit 2, the pedal shaft 10 and the chainwheel 17 together provide a transmission arrangement of the pedal vehicle. This concerns all the embodiments of the invention.

The method comprises controlling transmission ratio between the pedal shaft 10 and the chainwheel 17 with the main epicyclic gear set 40, transmitting torque to the assist gear 42 of the main epicyclic gear set 40 with the assist motor 22 for transmitting torque to the chainwheel 17 of the pedal vehicle, and adjusting the transmission ratio of the main epicyclic gear set 40 with a control motor 32 by transmitting torque to a control gear 48 of the epicyclic gear set 40. The control motor 32 and the control gear 48 form the control assembly of the power unit.

The method comprises operating the power unit 2 in the first operating mode in which the control gear 48 rotates in the first rotation direction, in which the first operating mode the control motor 32 is operable adjusting the transmission ratio of the main epicyclic gear set 40 by transmitting torque to the control gear 48. The method further comprises operating the power unit 2 in a second operating mode in which torque transmission between the of the control gear 48 and the control motor 32 is disabled.

According to the method, second operating mode comprises preventing rotation of a rotor of the control motor 32 or rotation of the control gear 48 of the main epicyclic gear set 40. Alternatively, the second operating mode comprises disabling torque transmission or rotation transmission between the control motor 32 and the control gear 48 of the main epicyclic gear set 40.

Further, the second operating mode comprises disabling adjusting the transmission ratio of the main epicyclic gear set 40 the one-way clutch 100 provided in connection with the control assembly. The one-way clutch may be as disclosed with above alternatives.

In a preferred embodiment, the method comprises operating the power unit 2 in the second operating mode when the transmission ratio is at a predetermined boundary value or less.

The method may further comprise operating the power unit 2 in the first operating mode at transmission ratios in which the control gear is rotated in the first rotation direction and in the second operating mode at transmission ratios in which the control gear is kept still or rotated in the second rotation direction opposite the first rotation direction.

The method may also comprise operating the power unit 2 in the second operating mode when the transmission ratio is at the lowest value of the epicyclic gear set.

In the embodiment of FIGS. 3 and 4, the method comprises transmitting power to the ring gear 42 of the main epicyclic gear set 40 with the assist motor 22 for transmitting power to the output shaft 17 of the pedal vehicle, and adjusting the transmission ratio of the main epicyclic gear set 40 with the control motor 32 by transmitting power to sun gear 48 of the epicyclic gear set 40. The control motor 32 and the sun gear 48 forms the control assembly of the power unit 2.

The method further comprises operating the power unit 2 in the first operating mode in which the sun gear 48 rotates in the first rotation direction, in which first operating mode the control motor 32 is operable adjusting the transmission ratio of the main epicyclic gear set 40 by transmitting power to the sun gear 48, and operating the power unit 2 in the second operating mode in which torque transmission between the sun gear 48 and the control motor 32 is disabled.

The invention has been described above with reference to the examples shown in the figures. However, the invention is in no way restricted to the above examples but may vary within the scope of the claims.

The invention claimed is:

1. A power unit having a housing for a pedal vehicle, the power unit comprising:
    a main epicyclic gear set arranged to control transmission ratio between a pedal shaft and an output shaft of the pedal vehicle, the main epicyclic gear set comprises a sun gear, a ring gear, plurality of planet gears between the sun gear and the ring gear and a planet carrier connected to the planet gears;
    an assist motor connected to an assist gear of the main epicyclic gear set and arranged to transmit torque to the output shaft;
    a control motor connected to a control gear of the main epicyclic gear set and arranged to adjust the transmission ratio of the main epicyclic gear set, the control motor and the control gear forming a control assembly of the power unit; and
    a one-way clutch provided to the control assembly of the power unit and arranged to transmit rotation in only a first rotation direction,
    the pedal shaft is connected to the planet carrier, the ring gear is connected to the output shaft, the control motor is connected to the sun gear, and the assist motor is connected to the ring gear;
    the ring gear forming the assist gear;
    the sun gear forming the control gear; and
    the control motor and the sun gear forming the control assembly and the one-way clutch is provided to the control assembly,
    wherein:
    the one-way clutch is arranged between the sun gear and the housing of the power unit.

2. The power unit according to claim 1, wherein the one-way clutch comprises a first operating state in which the one-way clutch is arranged to transmit rotation in the first rotation direction of the control gear, and a second operating state in which the one-way clutch is prevented from transmitting rotation in a second rotation direction of the control gear.

3. The power unit according to claim 2, wherein:
    the one-way clutch is provided in connection with the control gear, in the first operating state of the one-way clutch the control gear is arranged to rotate in the first rotating direction and in the second operating state of the one-way clutch rotation of the control gear in the second rotation direction is prevented.

4. The power unit according to claim 2, wherein the one-way clutch comprises:
    a freewheel arranged to enable rotation in the first rotation direction and prevent rotation in the second rotation direction; or
    a one-way gear mechanism arranged to enable rotation in the first rotation direction and prevent rotation in the second rotation direction.

5. The power unit according to claim 2, wherein the one-way clutch comprises:
    a wedge lock mechanism having the first operating state in which the wedge lock mechanism is in a disengaged position and arranged to transmit rotation in the first rotation direction, and the second operating state in which the wedge lock mechanism is in an engaged position and arranged to prevent transmitting rotation in the second rotation direction; or
    a friction lock mechanism having the first operating state in which the friction lock mechanism is in a disengaged position and arranged to transmit rotation in the first rotation direction, and the second operating state in which the friction lock mechanism is in an engaged position and arranged to prevent transmitting rotation in the second rotation direction; or
    a band lock mechanism having the first operating state in which the band lock mechanism is in a disengaged position and arranged to transmit rotation in the first rotation direction, and the second operating state in which the band lock mechanism is in an engaged position and arranged to prevent transmitting rotation in the second rotation direction; or
    a synchro mechanism having the first operating state in which the synchro mechanism is in a disengaged position and arranged to transmit rotation in the first rotation direction, and the second operating state in which the synchro mechanism is in an engaged position and arranged to prevent transmitting rotation in the second rotation.

6. The power unit according to claim 1, wherein the power unit comprises the housing accommodating the main epicyclic gear set, the control motor and the assist motor, the housing comprising a hub arranged around the pedal shaft and an arm extending from the hub, and that the control motor is arranged in the hub and the assist motor is arranged in the arm.

7. The power unit according to claim 1, wherein:
the power unit comprises at least one reduction gear set between control motor and the main epicyclic gear set; or
at least one reduction gear set between assist motor and the main epicyclic gear set; or
the power unit comprises at least one reduction gear set between control motor and the main epicyclic gear set, and at least one reduction gear set between assist motor and the main epicyclic gear set.

8. A method for operating a power unit of a pedal vehicle having a pedal shaft and an output shaft for transferring torque to a vehicle wheel, the power unit having a housing, the method comprising:
controlling transmission ratio between the pedal shaft and the output shaft with a main epicyclic gear set comprising a sun gear, a ring gear, a plurality of planet gears between the sun gear and the ring gear and a planet carrier connected to the planet gears;
transmitting power to an assist gear of the main epicyclic gear set with an assist motor for transmitting power to the output shaft of the pedal vehicle;
adjusting the transmission ratio of the main epicyclic gear set with a control motor by transmitting power to a control gear of the epicyclic gear set, the control motor and the control gear forming a control assembly of the power unit;
operating the power unit in a first operating mode in which the control gear rotates in a first rotation direction, in which first operating mode the control motor is operable adjusting the transmission ratio of the main epicyclic gear set by transmitting power to the control gear; and
operating the power unit in a second operating mode in which torque transmission between the of the control gear and the control motor is disabled,
wherein the method comprises:
transmitting power to the ring gear of the main epicyclic gear set with the assist motor for transmitting power to the output shaft of the pedal vehicle;
adjusting the transmission ratio of the main epicyclic gear set with the control motor by transmitting power to the sun gear of the epicyclic gear set, the control motor and the sun gear forming the control assembly of the power unit;
operating the power unit in the first operating mode in which the sun gear rotates in the first rotation direction, in which first operating mode the control motor is operable adjusting the transmission ratio of the main epicyclic gear set by transmitting power to the sun gear; and
operating the power unit in the second operating mode in which torque transmission between the sun gear and the control motor is disabled with a one-way clutch provided between the sun gear and the housing of the power unit.

9. The method according to claim 8, wherein in the second operating mode:
rotation of the sun gear of the main epicyclic gear set is prevented.

10. The method according to claim 8, wherein:
in the second operating mode adjusting the transmission ratio of the main epicyclic gear set is disabled with a one-way clutch or free-wheel.

11. The method according to claim 10, wherein the main epicyclic gear set is arranged to control the transmission ratio between the pedal shaft and the output shaft of the pedal vehicle.

* * * * *